United States Patent
Carter, Jr.

[11] Patent Number: 6,077,041
[45] Date of Patent: Jun. 20, 2000

[54] REDUCTION DRIVE AND TORQUE-LIMITING CLUTCH FOR AUTOGYRO AIRCRAFT

[75] Inventor: Jay W Carter, Jr., Burkburnett, Tex.

[73] Assignee: Cartercopters, LLC, Wichita Falls, Tex.

[21] Appl. No.: 09/004,499

[22] Filed: Jan. 8, 1998

Related U.S. Application Data

[60] Provisional application No. 60/035,036, Jan. 9, 1997.

[51] Int. Cl.[7] .................................................. A47C 7/74
[52] U.S. Cl. ................................. 416/169 R; 244/17.19
[58] Field of Search ........................... 416/169 R, 170 R; 474/110, 112, 113, 114; 192/224.1; 244/17.11, 17.25, 17.19, 17.21

[56] References Cited

U.S. PATENT DOCUMENTS

| | | | |
|---|---|---|---|
| 683,968 | 10/1901 | Moskowitz | 474/110 |
| 1,673,232 | 6/1928 | De Le Cierva | 416/169 R |
| 2,318,259 | 5/1943 | Sikorsky | 244/17.13 |
| 2,480,555 | 8/1949 | Couse | 474/113 |
| 2,761,432 | 9/1956 | Class | 416/169 R X |
| 3,142,193 | 7/1964 | Polko et al. | 474/110 |
| 3,253,474 | 5/1966 | Ballauer et al. | 416/170 R X |
| 3,383,933 | 5/1968 | Shultz et al. | 416/170 R X |
| 3,563,496 | 2/1971 | Zuck | 416/122 X |
| 3,576,299 | 4/1971 | Hanson | 244/17.17 |
| 3,785,220 | 1/1974 | Jacobs | 474/110 |
| 3,978,693 | 9/1976 | Worst | 474/110 X |
| 4,127,980 | 12/1978 | Ferguson | 56/11.3 |
| 4,344,598 | 8/1982 | Sloyan | 474/115 X |
| 4,400,930 | 8/1983 | Huhman et al. | 56/11.6 |
| 4,437,648 | 3/1984 | Thorn et al. | 474/113 X |
| 5,125,488 | 6/1992 | Green et al. | 192/220.1 |
| 5,355,597 | 10/1994 | Pollard | 37/94 |
| 5,358,452 | 10/1994 | Zhao | 474/133 |
| 5,527,218 | 6/1996 | Van Den Bossche et al. | 460/20 |
| 5,601,257 | 2/1997 | McKann | 244/17.25 |
| 5,680,998 | 10/1997 | Mason et al. | 241/101.76 |
| 5,727,754 | 3/1998 | Carter, Jr. | 244/17.11 X |

*Primary Examiner*—John E. Ryznic
*Attorney, Agent, or Firm*—Felsman Bradley Vaden Gunter & Dillon, LLP; James E. Bradley

[57] ABSTRACT

A rotary wing aircraft has an engine, an engine-driven shaft and a main rotor. A rotor drive shaft is mounted to the main rotor and extends substantially 90 degrees to the engine-driven shaft. A drive pulley is mounted to the engine-driven shaft. A driven pulley is operatively coupled to the rotor drive shaft. A drive belt extends around the drive and driven pulleys. A fluid cylinder has one end stationarily mounted to the engine and another end operatively coupled to the driven pulley to selectively move the driven pulley away from the drive pulley. This movement applies tension in the belt to cause the drive pulley to rotate the main rotor.

18 Claims, 6 Drawing Sheets

REDUCTION DRIVE AND TORQUE-LIMITING CLUTCH FOR AUTOGYRO AIRCRAFT

This application claims the benefit of U.S. Provisional Application No. 60/035,036, filed Jan. 9, 1997.

TECHNICAL FIELD

This invention relates to a reduction drive and clutch for the rotor of an autogyro aircraft, in which a pneumatic cylinder tightens or loosens a belt drive to provide a lightweight torque-limiting engaging and disengaging clutch.

BACKGROUND ART

Some autogyro aircraft have jump takeoff ability, in which the rotor is powered on the ground to a high rotation rate at zero rotor blade pitch (called prerotation), then the pitch is increased for vertical takeoff. The rotor is disengaged from the engine prior to takeoff. Such aircraft require a clutch between the rotor and the engine so that engine power can be disconnected from the rotor prior to takeoff. The rotor must not be powered in flight because autogyros do not have a tail rotor to counteract the torque applied to the main rotor.

In addition, piston engine autogyros require a clutch so that the engine can be started without the need to turn the rotor at the same time. To engage the clutch without stalling the engine, the clutch must have the ability to limit torque applied to the rotor. Rotary wing aircraft rotors turn at relatively low speeds compared to aircraft engines, requiring a reduction unit to be introduced between the engine and the rotor.

In autogyros, the prerotation mechanism, reduction drive, and rotor drive shaft can be engineered to be very light since they are powered only prior to takeoff (non-continuous) and at a torque level no greater than needed to adequately accelerate the rotor and overcome rotor profile drag (low horsepower relative to available engine horsepower). The prerotation mechanism thus requires a maximum torque limiting device to avoid overstressing the lightweight, light duty prerotation mechanism.

DISCLOSURE OF INVENTION

Accordingly, a primary object of the invention is to provide a lightweight prerotator reduction drive for an autogyro or gyroplane.

A further primary object of the invention is to provide a clutch with a variable torque limiting feature, such that the clutch slips at very low torque while the rotor is initially being engaged with the engine, and such that the clutch slips at a higher yet still limited torque once the clutch is fully engaged, to protect the drive from maximum engine torque.

The objects of the invention are achieved with a belt reduction drive, the pulley connected to the rotor drive shaft having an axis of rotation moveable by varying pressure on a pneumatic cylinder, thereby tightening the belt to engage the clutch or loosening the belt to release the clutch.

The above as well as additional objects, features, and advantages of the invention will become apparent in the following detailed description.

BRIEF DESCRIPTION OF DRAWINGS

FIG. 1b is an enlarged side view and partial section of the lower end of the rotor drive shaft of the mechanism of FIG. 1a.

FIG. 4 is a schematic view of an alternate embodiment of a clutch and torque limiting mechanism constructed in accordance with the invention.

BEST MODE FOR CARRYING OUT THE INVENTION

Figure 1A:
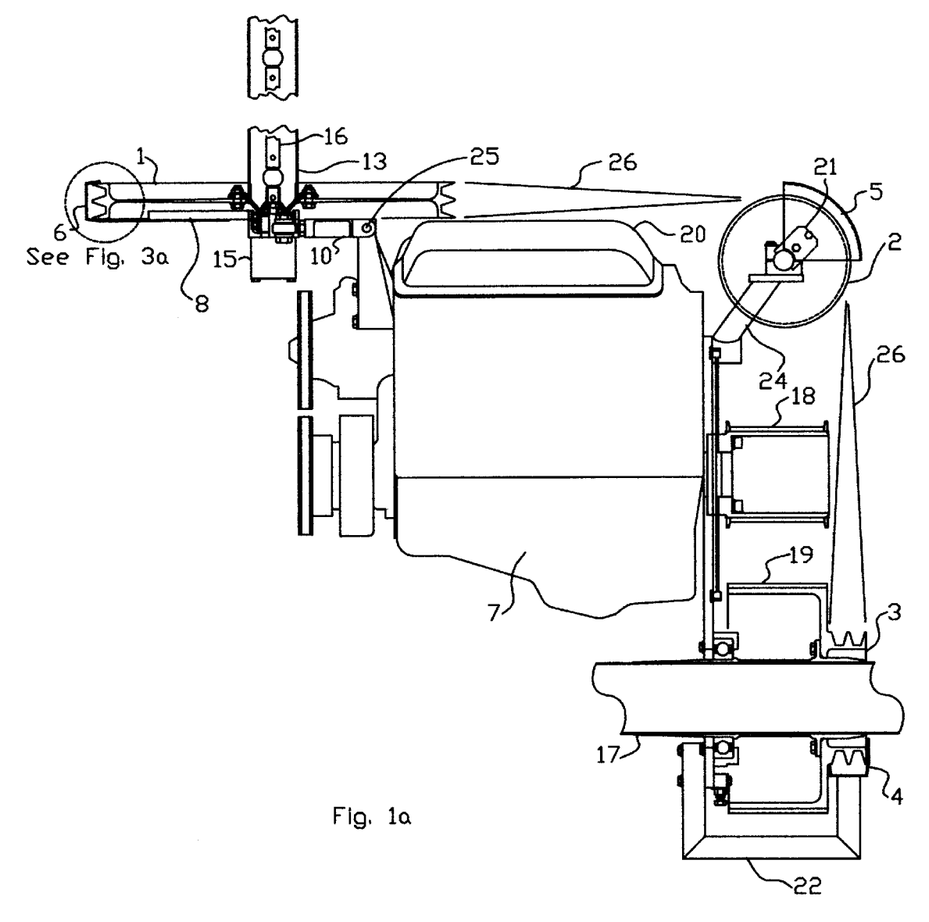
FIG. 1a is a schematic side view and partial section of an engine and rotor prerotation mechanism constructed in accordance with the invention.

FIG. 1a shows a side view of the engine, reduction drive, and clutch for an autogyro aircraft. Engine 7 is a V-6 engine shown schematically with cam covers 20 indicating orientation. Engine drive sprocket 18 is connected to propeller shaft sprocket 19 by a cog belt (not shown) to rotate propeller shaft 17. Shaft 17 has a propeller (not shown) connected to one end. A drive pulley 3 is attached to propeller shaft sprocket 19.

Figure 1B:
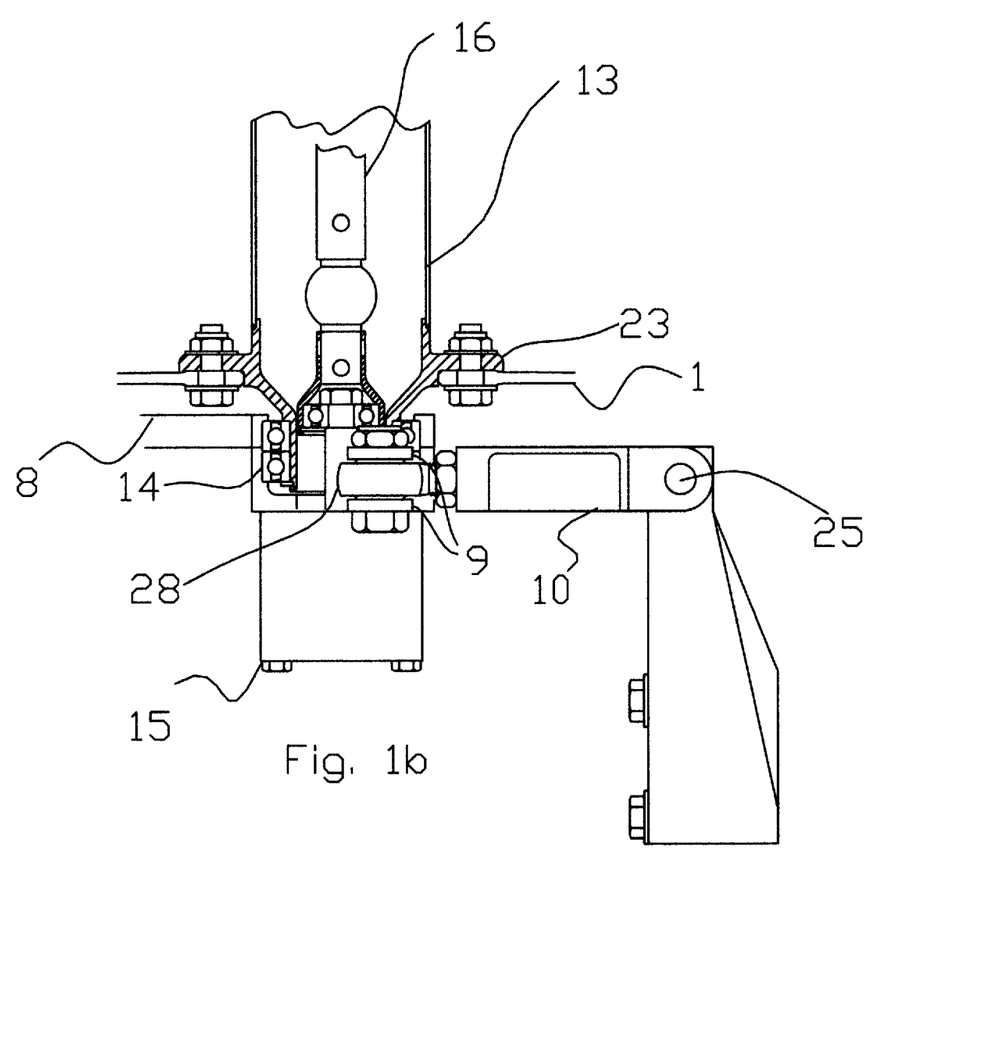

A rotor drive or driven pulley 1 is bolted to a rotor drive shaft 13 through flange 23 (FIG. 1b). The rotor drive shaft 13 is oriented at generally right angles to the propeller shaft 17 and is supported at its top end by a universal joint (not shown). Driven pulley 1 is powered by the engine only during prerotation but it turns with the rotor throughout flight. The inner race of a double row ball bearing 14 is also connected to flange 23 and thereby to driven pulley 1. The nonrotating outer race of bearing 14 is attached to arm 9, and arm 9 is attached through a spherical rod end bearing 28 to bracket 10. Bracket 10 is mounted to engine 7. Hydraulic cylinder 15 pushes and pulls rod 16 through the center of rotor drive shaft 13 to accomplish rotor collective control.

Referring again to FIG. 1a, idler pulleys 2 each turn on a ball bearing mounted on an arm 24, which is bolted to engine 7. A belt 26, of which only the edges are shown, passes around rotor drive pulley 1, around one of the idler pulleys 2, around drive pulley 3, and around the other idler pulley 2 (FIG. 2), forming a closed loop. Belt 26 preferably has longitudinal fibers to resist stretching.

Belt retainers 5 and 6 keep belt 26 near but not touching pulleys 1 and 2 when the belt is not under tension. A belt retainer 4 is located around a portion of drive pulley 3. More details on the design and function of belt retainers 4, 5 and 6 will be provided later. Belt retainers 4, 5, and 6 are held by belt retainer brackets 22, 21, and 8 (FIGS. 1 and 2) respectively.

Since drive pulley 3 is much smaller in diameter than driven pulley 1, a reduction in rotation rate and an increase in torque are achieved. Both are useful in providing efficient transfer of power between engine 7, which turns at a higher speed, and the rotor, which turns at a lower speed.

Figure 2:
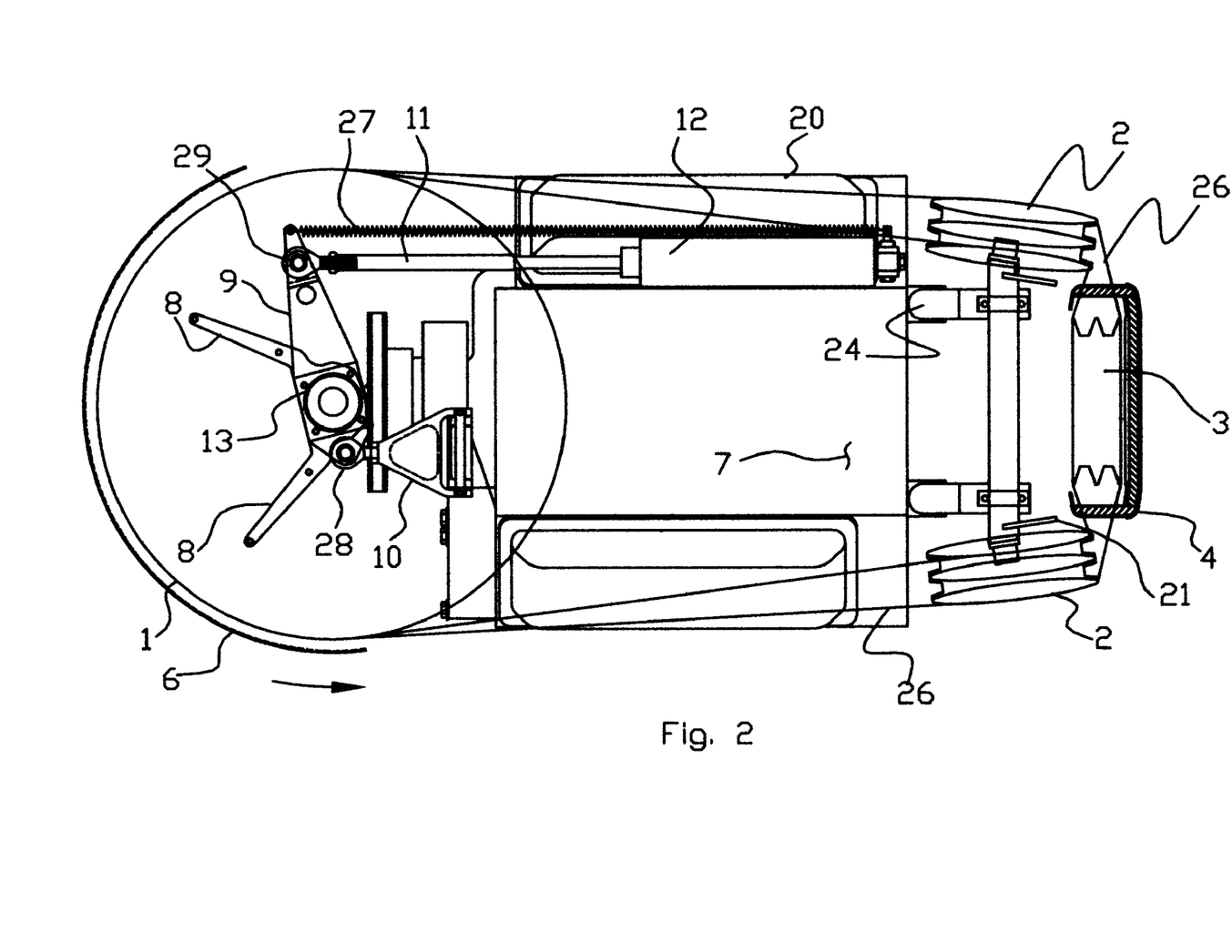
FIG. 2 is a top view of the engine and rotor prerotation mechanism of FIG. 1.

FIG. 2 shows a top view of engine 7 and clutch and reduction drive of FIG. 1a. Driven pulley 1 is shown transparent to reveal parts below. The cylinder 12 of a fluid piston and cylinder and one end of spring 27 are stationarily mounted to engine 7. Fluid cylinder 12, bracket 10 and arm 24 are mounted directly to engine 7 instead of to the fuselage structure so that belt drive loads are not transferred through the engine's rubber engine mounts. A piston rod 11 of the fluid piston and cylinder 12 is attached through spherical bearing rod end 29 to arm 9. The other end of spring 27 is also attached to arm 9. Spring 27 holds piston rod 11 in the retracted position within cylinder 12 if the pressure within the fluid cylinder 12 is low enough.

Arm 9 pivots at spherical bearing rod end or pivot point 28 which is held by bracket 10. Bracket 10 is attached to the engine 7 by a hinge 25, which allows driven pulley 1 to move upward slightly due to lift loads on the rotor head (not shown), since the rotor head is resiliently mounted to the fuselage. The rotor head is described in a co-pending application entitled Rotor Head for Rotary Wing Aircraft, identified by attorney docket 0992F-011, filed on the same date and incorporated herein by reference. Arm 9 through bracket 10 is attached to engine 7 instead of to the fuselage so that engine vibration does not change the center distance between pulleys 1 and 2, and therefore does not change the belt tension.

Rotor drive shaft 13 is connected through ball bearing 14 (FIG. 1b) to the arm 9 (FIG. 2) adjacent to the spherical bearing rod end 28 so that rod end 28 is off center from drive shaft 13. Drive shaft 13 is connected to arm 9 between pivot point 28 and pivotal connection 29 of fluid cylinder rod 11. When air pressure is applied to fluid cylinder 12, it extends piston rod 11, which rotates arm 9 counterclockwise (as viewed in FIG. 2) around spherical bearing 28. Since driven pulley 1 is centered on rotor drive shaft 13, a counterclockwise movement of arm 9 moves driven pulley 1 in an arcing curvilinear motion to the left (counterclockwise around spherical bearing 28). This increases the linear distance of the driven pulley 1 from the pulleys 2,3 so that the belt 26 is tightened. Belt retainer 6 is attached to arm 9 by bracket 8, so it moves along with arm 9, maintaining a constant distance between belt retainer 6 and driven pulley 1.

When air pressure is released from fluid cylinder 12, spring 27 fully retracts piston rod 11, which rotates arm 9 clockwise (as viewed in FIG. 2) around spherical bearing rod end 28, loosening belt 26. Fluid cylinder 12 is provided with three levels of air pressure from a pressure controller 30 (FIG. 2): atmospheric, low, and high. At atmospheric pressure belt 26 is loose. Atmospheric pressure is the position used for all flight and when initially starting engine 7. Low pressure engages belt 26 with driven pulley 1, but sets the maximum torque to a relatively low value, so that belt 26 engages but slips, accelerating a stopped or slowly rotating rotor without stalling the engine running at near idle speed. Low pressure is used after engine 7 has started to commence rotation of the rotor. Once the rotor has accelerated to the rotation rate necessary to prevent slipping at low engine speed, high pressure is applied to fluid cylinder 12. High pressure allows higher engine power settings to speed up the rotor to a non-lifting overspeed takeoff rotation rate but still limits the torque to prevent damage to the prerotation mechanism. High pressure is discontinued immediately prior to takeoff.

Figure 3:
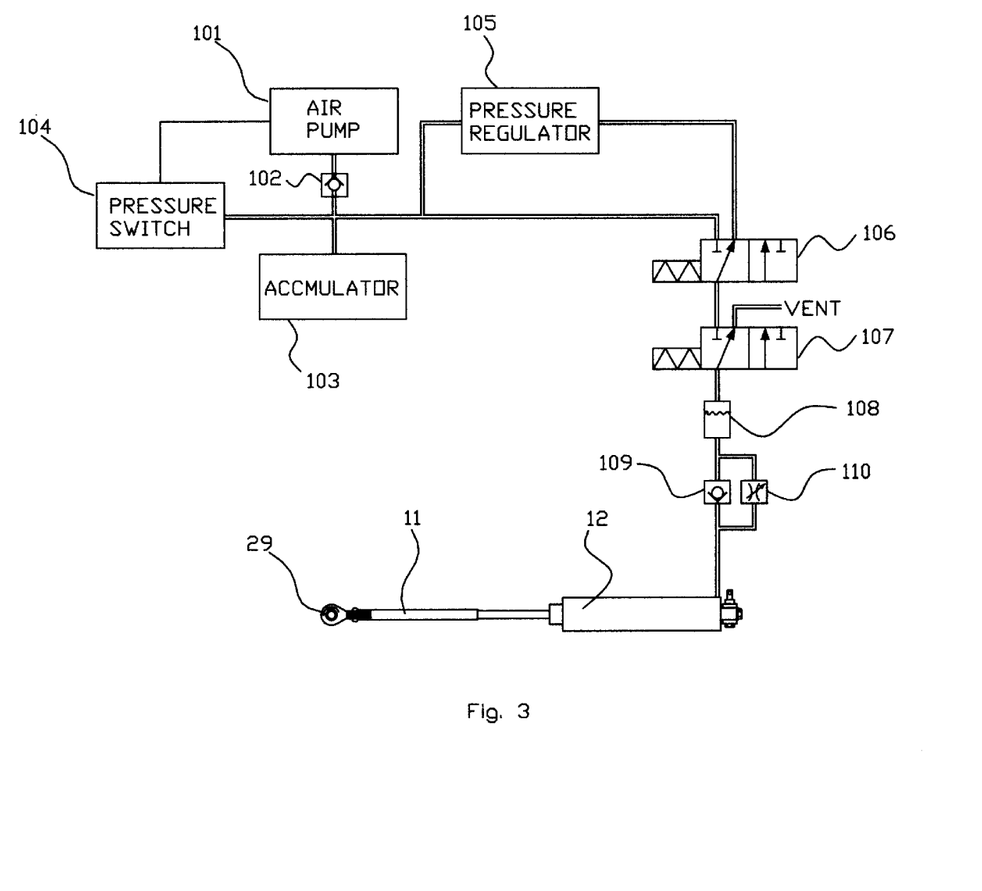
FIG. 3 is a pneumatic control schematic for the pneumatic cylinder shown in FIG. 2.

Air pressure to fluid cylinder 12 is supplied by the control system shown in FIG. 3. An air pump 101 is attached through a one-way valve 102 to an accumulator 103. A pressure switch 104 monitors the pressure in accumulator 103 and turns air pump 101 on and off as needed to maintain a selected pressure in accumulator 103 of approximately 180 psi.

Accumulator 103 is connected directly to one input of a high/low pressure select solenoid 106. Accumulator 103 is also connected to a 60 psi pressure regulator 105, which is connected to the other input of solenoid 106. The output of solenoid 106 is connected to one input of a pressure/vent select solenoid 107. The other input of solenoid 107 is vented to the atmosphere. The output of solenoid 107 is connected to the top of an air/oil tank 108 which is partially filled with oil. The bottom of tank 108 is connected to a combination one-way valve 109 adjustable orifice 110. One-way valve 109 allows oil to flow freely from fluid cylinder 12 to tank 108, but not in the other direction. Adjustable orifice 110 controls the rate of flow of oil from tank 108 to fluid cylinder 112. The size of one-way valve 109 controls the rate at which the clutch releases, while the adjustment of orifice 110 controls the rate at which the clutch engages. The fluid cylinder is filled with oil to provide damping.

Because the force on driven pulley 1 and therefore the tension on belt 26 is applied by fluid cylinder 12, that force and tension are dependent only on the air pressure and not dependent on the position of the fluid cylinder's piston rod 16 in its stroke. Therefore belt 26 can stretch without changing the torque settings at low and high torque. Also, if the coefficient of friction between belt 26 and pulleys 1 and 3 is greater than one at high torque setting, belt 26 will be slack on one side and fluid cylinder 12 will be compressed until the force on the taut side is equal to the force exerted by fluid cylinder 12, limiting the maximum torque.

When belt 26 is loose, belt 26 no longer moves, so it must be prevented from touching drive pulley 3 or driven pulley 1, to prevent damage from friction and heat. When air pressure is released from fluid cylinder 12, spring 27 moves driven pulley 1 to the position where fluid cylinder 12 is completely retracted, creating slack in belt 26. This is the flying position and is also fail safe in case of air compressor failure. The amount of slack in belt 26 is adjustable using the threads on spherical bearing rod ends 28 and 29.

Belt retainer 6 moves with the driven pulley 1, and belt retainers 4, 5, and 6 are close fitting. Each is closely spaced to the groove in the respective pulley and extends partially circumferentially around the respective pulley. Since belt 26 is relatively stiff, when there is the correct amount of slack in the belt, it is pushed into contact with the belt retainers 4, 5 and 6 and away from the pulleys 3,2 and 1, respectively. Too much slack in belt 26 will cause the belt to buckle between the pulleys, potentially allowing the belt to move away from retainers 4 and 6 and touch the rotating pulleys 1 and 3. Belt retainers 5 can be more close fitting than the other two belt retainers 4 and 6 because idler pulleys 2 do not rotate when belt 26 is slack and not moving.

Figure 4A:
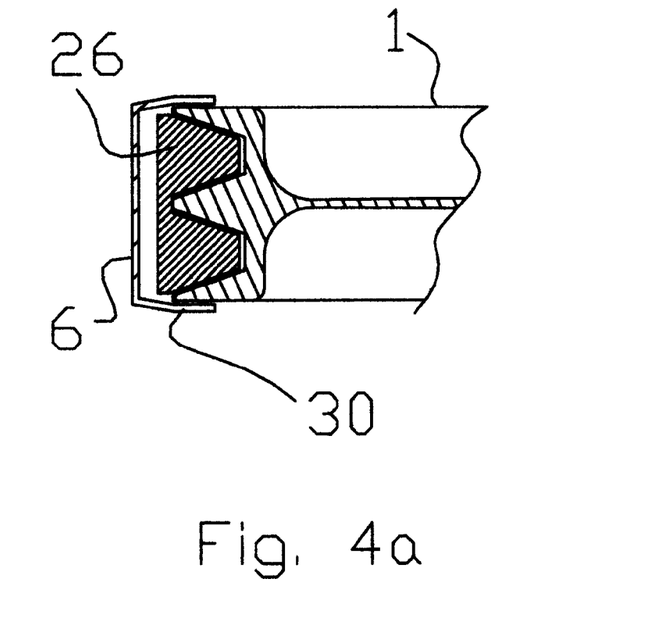
FIG. 4a is an enlarged partial sectional view of the rotor drive pulley, belt retainer, and belt of the prerotation mechanism of FIG. 1, shown when the belt is tight.
Figure 4B:
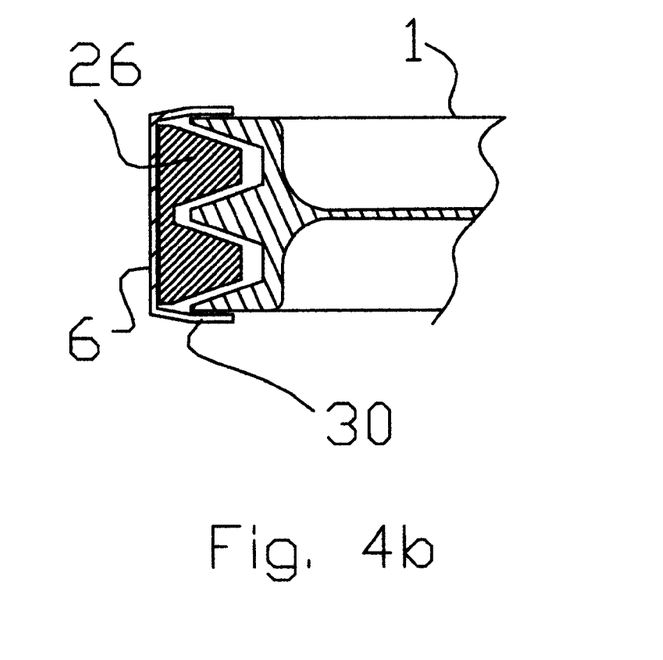
FIG. 4b is a view similar to FIG. 3a, but showing the belt loose.

FIG. 4a shows a detail of rotor drive pulley 1, belt 26, and belt retainer 6 when belt 26 is in the tight position, and FIG. 4b shows it in the slack position. Because of the stiffness of belt 26 and the reduced amount of distance between pulleys in the slack position shown in FIG. 4b, belt 26 is pushed against belt retainer 6 for its entire length and does not touch pulley 1. Belt retainer 6 has sloped interior sides 30 which center belt 26 in belt retainer 6 when belt 26 is in the slack position. The same retainer design is used for belt retainers 4 and 5.

Figures 5, 6:
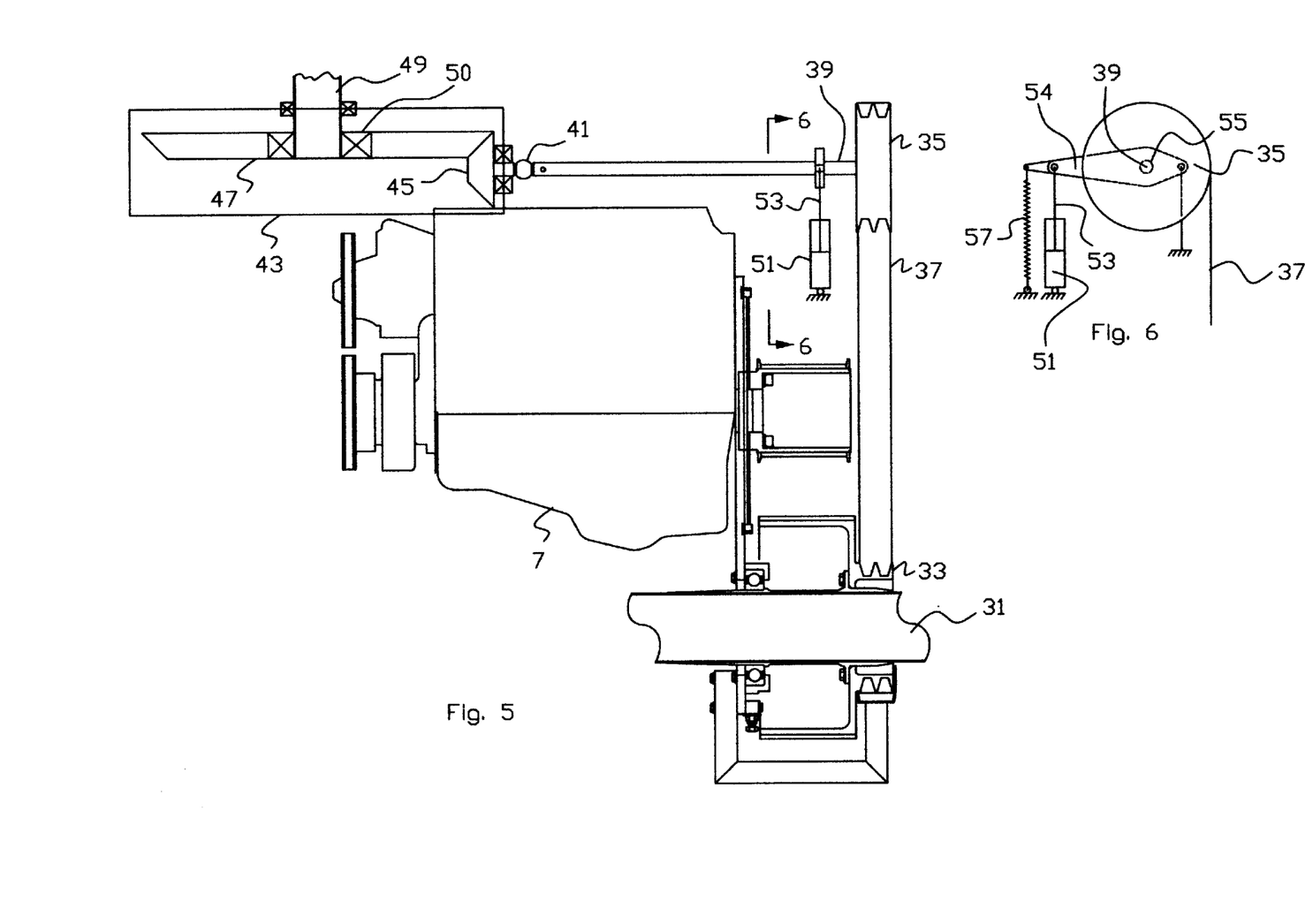
FIG. 5 is a schematic view of an alternate embodiment of a clutch and torque limiting mechanism constructed in accordance with the invention.
FIG. 6 is a sectional view of a portion of the mechanism of FIG. 5, taken along the line 6—6 of FIG. 5.

An alternate embodiment is shown in FIGS. 5 and 6. A propeller shaft 31 is driven by the aircraft engine 7 is shown. Shaft 31 rotates a drive pulley 33, which in turn will rotate a driven pulley 35. A belt 37 extends between pulleys 33, 35, which are in alignment in the same plane. Pulley 35 rotates an input shaft 39 which has a universal joint 41 and which is coupled to a right angle drive, such as a gearbox 43. Gearbox 43 has two gears 45, 47 and an output shaft 49 which rotates the rotor (not shown). A one-way roller clutch 50 may be mounted in gearbox 43 to allow rotor shaft 49 to rotate during flight without turning gear 45, 47. When drive shaft 31 is driven, however, by the engine, one-way roller clutch 50 causes rotor shaft 49 to rotate.

A fluid cylinder 51 is mounted to the engine parallel to the pulleys 33, 35 and belt 37. Cylinder 51 has a rod 53 which is pivotally mounted by an arm 54 (FIG. 6) to a bushing 55 which supports input shaft 39. A spring 57 connected between arm 54 and engine 7 urges rod 53 to a retracted position. Applying air pressure (dampened by oil) causes rod 53 to extend, moving driven pulley 35 away from drive pulley 33 and tightening belt 37. Universal joint 41 allows the end of shaft 39 at bushing 55 to move linearly while the end coupled to gearbox 43 remains stationary. One-way roller clutch 50 allows gears 47, 45, shaft 39 and pulley 35 to stop once belt 37 is loosened, even though rotor shaft 49 continues to turn.

The invention has significant advantages. The mechanism allows the engine to be started without the drag imposed by the rotor rotating. The mechanism allows the rotor to be gradually brought up to speed. It allows the rotor to be easily disconnected from being driven by the engine for takeoff. The mechanism is lightweight and adjustable.

The invention is not limited to the preferred embodiment described above; on the contrary the invention extends to any variant that reproduces the above-described essential characteristics by equivalent means.

I claim:

1. In a rotary wing aircraft having an engine, an improved apparatus for connecting an engine-driven shaft to a main rotor, comprising:

a rotor drive shaft which is attached to the main rotor;

a drive pulley attached to the engine-driven shaft and having a circumferential groove;

a driven pulley attached to the rotor drive shaft and having a circumferential groove;

a drive belt passing around and engaging the grooves of the drive pulley and the driven pulley;

a fluid cylinder having one end stationarily mounted to a selected part of the aircraft and another end positioned to selectively apply tension to the belt when supplied with fluid pressure to cause the drive pulley to rotate the driven pulley, the fluid cylinder creating slack in the belt when the cylinder is not under pressure to cease causing the drive pulley to drive the driven pulley;

a drive pulley belt retainer extending partially around the drive pulley for holding the belt centered and near but not touching the groove of the drive pulley when the belt is slack; and an arcuate driven pulley belt retainer extending partially around the driven pulley for holding the belt centered and near but not touching the groove of the driven pulley when the belt is slack.

2. The aircraft according to claim 1, wherein the rotor drive shaft is approximately at a right angle to the engine-driven shaft, and wherein the aircraft further comprises:

two idler pulleys mounted to the aircraft for engaging the belt between the drive and driven pulleys, each of the idler pulleys having a circumferential groove, the drive belt passing over and engaging the grooves of the idler pulleys between the drive pulley and the driven pulley; and an arcuate idler pulley belt retainer for each of the idler pulleys, each of the idler pulleys extending partially around the groove of one of the idler pulleys to retain the belt when the belt is not under tension.

3. The aircraft according to claim 1, further comprising:

a fluid control system for controlling air pressure at the fluid cylinder, the control system having a first pressure setting which causes the fluid cylinder to apply sufficient tension to the belt to commence rotation of the rotor but allow slippage of the belt around the driven pulley, a second pressure setting to increase the tension in the belt after the rotor has commenced rotation to cause the rotor to rotate without slippage of the belt, and a third pressure setting used at initial startup of the engine, immediately prior to takeoff and during flight to create slack in the belt.

4. The aircraft according to claim 1 wherein the fluid cylinder moves the driven pulley a short distance relative to the drive pulley to increase and decrease tension in the belt.

5. The aircraft according to claim 1, further comprising:

a bearing which supports the rotor drive shaft, the bearing having a nonrotating sleeve, the bearing, sleeve and rotor drive shaft being movable a short distance relative to the drive pulley; and a lever arm having a first pivot point stationarily mounted to the engine, a second pivot point pivotably attached to the fluid cylinder, and a third pivot point attached to the sleeve, so that applying fluid pressure to the fluid cylinder causes the lever arm to rotate about the first pivot point and translationally move the driven pulley to increase tension in the belt.

6. The aircraft according to claim 5 wherein the third pivot point is spaced between the first and second pivot points.

7. In a rotary wing aircraft having an engine, an engine-driven shaft extending on a longitudinal axis, and a main rotor, the improvement comprising:

a rotor drive shaft which is mounted to the main rotor substantially 90 degrees to the longitudinal axis;

a bearing which supports the rotor drive shaft, the bearing having a nonrotating sleeve;

a drive pulley mounted to the engine-driven shaft;

a driven pulley mounted to the rotor drive shaft in a plane substantially perpendicular to a plane containing the drive pulley, the driven pulley being translationally movable a short distance relative to the drive pulley;

a pair of idler pulleys stationarily mounted to the engine;

a drive belt passing around the drive pulley, the idler pulleys and the driven pulley; and a fluid cylinder having one end stationarily mounted to the engine and a piston rod coupled to the sleeve of the bearing to selectively move the driven pulley away from the drive pulley to apply tension in the belt to cause the drive pulley to rotate the driven pulley and to move the driven pulley toward the drive pulley to remove tension in the belt and prevent the drive pulley from driving the driven pulley.

8. The aircraft according to claim 7, further comprising:

an arcuate drive pulley belt retainer extending partially around the drive pulley for holding the belt centered and near but not touching the drive pulley when tension in the belt is removed; and an arcuate driven pulley belt retainer extending partially around the driven pulley for holding the belt centered but not touching the driven pulley when tension in the belt is removed.

9. The aircraft according to claim 7, further comprising:

an arcuate idler pulley belt retainer for each of the idler pulleys, each of the idler pulleys extending partially around one of the idler pulleys to retain the belt when tension in the belt is removed.

10. The aircraft according to claim 7, further comprising:

an arm having a pivot point mounted to the engine, the sleeve of the bearing being rotatably mounted to the arm and the piston rod being pivotally mounted to the arm, so that extension and retraction of the piston rod causes the arm to rotate about the pivot point to move the driven pulley translationally.

11. The aircraft according to claim 7, further comprising:

a control system for controlling air pressure at the fluid cylinder, the control system having a low air pressure setting to cause the fluid cylinder to apply sufficient tension to the belt to commence rotation of the rotor but allow slippage of the belt around the driven pulley, a high pressure setting to increase the tension in the belt to prevent slippage after the rotor has commenced to rotate, and an atmospheric pressure setting to remove tension in the belt for starting the engine and for flight.

12. In a rotary wing aircraft having an engine, an engine-driven shaft extending on a longitudinal axis, and a main rotor, the improvement comprising:

a rotor drive shaft which is mounted to the main rotor substantially 90 degrees to the longitudinal axis;

a drive pulley mounted to the engine-driven shaft;

a driven pulley operatively coupled to the rotor drive shaft;

a drive belt extending around the drive and driven pulleys; and a fluid cylinder having one end stationarily mounted to the engine and another end operatively coupled to the driven pulley to selectively move the driven pulley toward and away from the drive pulley to remove and apply tension in the belt.

13. The aircraft according to claim 12, further comprising:

a control system for controlling air pressure at the fluid cylinder, the control system having a low air pressure setting to cause the fluid cylinder to apply sufficient tension to the belt to commence rotation of the rotor but allow slippage of the belt around the driven pulley, a high pressure setting to increase the tension in the belt to prevent slippage after the rotor has commenced to rotate, and an atmospheric pressure setting to remove tension in the belt for starting the engine and for flight.

14. The aircraft according to claim 12, wherein the driven pulley is located in the same plane as the drive pulley and wherein the aircraft further comprises:

a right angle drive connected to the rotor drive shaft; and an input shaft which has a first end connected to the driven pulley and a second end connected to the right angle drive.

15. The aircraft according to claim 14, further comprising:

a universal joint in the input shaft to allow movement of the first end of the input shaft relative to the second end as the fluid cylinder moves the driven pulley toward and away from the drive pulley.

16. The aircraft according to claim 14 wherein the right angle drive is a gearbox.

17. The aircraft according to claim 12 wherein the driven pulley is operatively coupled to the rotor drive shaft by a one-way clutch which allows the engine to drive the rotor but the rotor cannot drive the engine.

18. The aircraft according to claim 14 wherein the right angle drive has a one-way clutch which causes rotation of the rotor drive shaft when the input shaft is driven by the engine, but which allows the rotor drive shaft to rotate without causing rotation of the input shaft when the engine is not driving the input shaft.

\* \* \* \* \*